US012693173B2

(12) United States Patent
Rowland

(10) Patent No.: US 12,693,173 B2
(45) Date of Patent: Jul. 28, 2026

(54) PERSONAL TEMPERATURE RECORDING DEVICE

(71) Applicant: Gary Rowland, Marshfield, MO (US)

(72) Inventor: Gary Rowland, Marshfield, MO (US)

( * ) Notice: Subject to any disclaimer, the term of this patent is extended or adjusted under 35 U.S.C. 154(b) by 153 days.

(21) Appl. No.: 17/181,400

(22) Filed: Feb. 22, 2021

(65) Prior Publication Data

US 2022/0082456 A1    Mar. 17, 2022

Related U.S. Application Data

(60) Provisional application No. 63/078,932, filed on Sep. 16, 2020.

(51) Int. Cl.
G01K 13/20        (2021.01)
G02C 11/00        (2006.01)

(52) U.S. Cl.
CPC .............. G01K 13/20 (2021.01); G02C 11/10 (2013.01)

(58) Field of Classification Search
CPC .......... G01K 13/20; G01K 7/00; G01K 13/00; G01K 1/02; G01K 1/028; G01K 1/14; G01K 1/143; G01K 1/24; G02C 11/10; G02C 11/00; A41D 19/0027; A41D 13/1184; A61B 5/68; A61B 5/6801; A61B 5/6802; A61B 5/6803; A61B 5/6813; A61B 5/01
USPC ........................................................ 374/163
See application file for complete search history.

(56) References Cited

U.S. PATENT DOCUMENTS

| | | | | |
|---|---|---|---|---|
| 4,232,684 A | * | 11/1980 | Chervitz | .............. G01K 11/165 |
| | | | | 374/E13.002 |
| 9,301,719 B2 | * | 4/2016 | Abreu | ................ A61B 5/14553 |
| 10,973,267 B1 | * | 4/2021 | Correa | ................... G01K 13/20 |
| 2008/0218684 A1 | * | 9/2008 | Howell | ................... G02C 11/10 |
| | | | | 351/158 |
| 2019/0021616 A1 | * | 1/2019 | Day | .................... A61B 5/02427 |
| 2021/0154487 A1 | * | 5/2021 | Bongberg | .............. G16H 80/00 |
| 2021/0278290 A1 | * | 9/2021 | Ghoreyshi | ............. A61B 5/746 |
| 2021/0316902 A1 | * | 10/2021 | Silva | ........................ G01K 1/143 |
| 2021/0330191 A1 | * | 10/2021 | Zanjani | ................ A61B 5/6803 |
| 2021/0345884 A1 | * | 11/2021 | Singh | ........................ A61B 5/01 |
| 2022/0178743 A1 | * | 6/2022 | Howell | ................. G01J 1/0238 |
| 2022/0386878 A1 | * | 12/2022 | Li | ............................ G01J 5/064 |

FOREIGN PATENT DOCUMENTS

DE            10123226 A1 * 11/2002    ........... A61B 5/0008

* cited by examiner

*Primary Examiner* — Andrew Schechter
*Assistant Examiner* — Matthew W. Baca
(74) *Attorney, Agent, or Firm* — Brennan, Manna & Diamond, LLC

(57)            ABSTRACT

The present invention relates to personal protective equipment for individuals that allows the wearer, and those in close proximity to the wearer, to continuously monitor the wearer's temperature. The eyeglasses have a temperature sensor that is disposed adjacent the head of the wearer, and a display connected to the temperature sensor which shows the current temperature of the wearer. If the temperature is detected at a level higher than a user specified threshold, the display changes color or provides another warning to those nearby, as well as to the individual wearer.

13 Claims, 3 Drawing Sheets

174    176    178    170

98.6

125

172

125

190

98.6

120

130

180

PERSONAL TEMPERATURE RECORDING DEVICE

CROSS-REFERENCE TO RELATED APPLICATION

The present application claims priority to, and the benefit of, U.S. Provisional Application No. 63/078,932, which was filed on Sep. 16, 2020 and is incorporated herein by reference in its entirety.

FIELD OF THE INVENTION

The present invention relates generally to the field of personal protective equipment. More specifically, the present invention relates to eyewear, goggles or face shields that can provide real time temperature information to the wearer, as well as to those in the immediate vicinity of the wearer. Providing temperature information in a human readable display allows an individual, as well as those nearby, to determine if the individual wearing the device is suffering from an elevated temperature, which may suggest that the individual is contagious or otherwise ill and to maintain appropriate social distancing. More specifically providing a display which is positioned near a temperature sensor enables the collection and transmission of the temperature information to the display to illustrate the current temperature condition of the individual. The display is provided on a portion of a frame of, for example, eyewear, goggles, face shields, face masks or the like, such as the side arms or supports of a pair of eyeglasses so that it can be easily seen by those in close proximity. By providing real time temperature information, individuals showing an elevated temperature can be stopped from, for example, attending an event, entering an establishment or joining a large gathering until their temperature can be checked and verified. Accordingly, the present specification makes specific reference thereto. However, it is to be appreciated that certain aspects of the present invention are also equally amenable to other like applications, devices and methods of manufacture.

BACKGROUND OF THE INVENTION

During pandemics and other areas suffering "hot spots" due to a break out of an illness, contagious virus or other bacteria, regular monitoring of individuals is required in order to slow and even halt the spread of the disease. One way to conveniently monitor individuals is through their current body temperature. Individuals with elevated temperatures may need to be quarantined until the disease passes, or until they can be cleared for further activity if an additional reading or tests are required in order to confirm whether the individual is contagious or not, and/or their temperature returns to a normal temperature range.

Today, and when such testing protocols are in place, individuals are required to be scanned, usually with a handheld thermometer before entering a workplace or other establishment, such as a medical facility, school, or the like. If the individual's temperature is considered to be normal (i.e., not elevated), then the individual is permitted to enter the building or event. On the other hand, if the individual's temperature is considered elevated, the individual will be denied access to the facility or event to avoid the potential spread of contamination and/or disease.

However, there are problems with such procedures. For example, collecting temperature information and data from a number of members of the public causes long lines or queues to form which can lead to people becoming annoyed and irritated with having to wait. In addition, by having people congregate in areas to be checked, this in and of itself may lead to additional people becoming infected, thereby defeating the purpose of having areas to check people. In addition, when members of the public are standing outside, potentially for long periods of time, and there is no cover from the afternoon sun, the temperature of the individual can rise due to the heat and potentially generate a false indication that the individual is suffering from the illness due to the elevated temperature reading.

In addition, healthcare professionals, building and event security and others charged with checking temperatures, must themselves wear personal protective equipment including face shields, gloves, gowns and the like to engage in the testing or screening of others. In order to get close enough to the individual to be tested or scanned, the individual conducting the testing must stand nearby, typically at arm's length, so that they can use a thermal scanner to collect the temperature information. According to the Centers for Disease Control and Prevention (CDC), arm's length has been determined as not being a sufficient distant from one another, as bacteria, viruses and other contagions can travel more than six feet from an infected individual due to speaking, sneezing or the like. This then puts the individual and other personnel conducting the temperature testing at risk for infection, particularly after long periods of time of testing as the personnel may become weary and fail to follow proper protocol.

Therefore, there exists a long felt need in the art for an improved system for providing real time temperature information of an individual to both the individual and those in proximity to the individual while still maintaining appropriate social distancing (i.e., at least six feet of separation). There is also a long felt need in the art for an improved system for determining real time temperature information of an individual without the need for the individual to wait in long lines for his or her temperature to be checked by healthcare or other security personnel. By providing a personalized system to correctly and quickly relay real time temperature data, individuals would then be able to walk past the lines and into a building or event as the readout would be present and displayed on the personal protective equipment and could be easily read or viewed by the building or event security or other personnel. In this way, the building or event personnel can also maintain a safe distance from the entrants, helping to protect them from becoming infected from the disease as well. Moreover, there is a long felt need in the art to incorporate a real time temperature indicator into an existing form of personal protective equipment including, but not limited to, eyewear, goggles, face shields, face masks and the like. Finally, there is a long felt need in the art for an improved system for providing real time temperature information of an individual that is relatively inexpensive to manufacture, and that is both safe and easy to use.

In this manner, the improved personal temperature recording device and display of the present invention accomplishes all of the forgoing objectives, and substantially departs from the concepts and designs of conventional means of taking one's temperature.

SUMMARY OF THE INVENTION

The following presents a simplified summary in order to provide a basic understanding of some aspects of the disclosed innovation. This summary is not an extensive over-view, and it is not intended to identify key or critical elements or to delineate the scope thereof. Its sole purpose is to present some general concepts in a simplified form as a prelude to the more detailed description that is presented later.

The present invention relates to personal protective equipment such as eyeglasses, face shields, goggles, masks, spectacles and the like that may be utilized to both gather and publicly display the temperature of the wearer so that others can view the same while maintaining appropriate social distancing. The eyeglasses in one example may be worn like traditional eyeglasses, so as not to provide discomfort to the individual while at the same time providing a valuable personal and public service in communicating the current and real time temperature of the person wearing the eyeglasses via a temperature sensor and human readable display, preferably positioned on the frame of the eyeglasses.

In a further exemplary embodiment of the presently described invention, a pair of eyeglasses is described that comprises a frame having first and second arms extending outwardly from each end of the frame. The first and second arms are provided for supporting the frame on a face of an individual with each of the first and second arms having an interior surface with a temperature sensor positioned therein, an exterior surface, a front end and a back end. When worn, the interior surface of the frame arm is positioned immediately adjacent to the surface of the individual's head such that the temperature sensor is capable of reading the temperature of the individual in real time. The sensor is, in turn, in communication with a display that is provided on the exterior surface of one of the first and second arms, wherein the display provides human readable indicia including, without limitation, the temperature of the individual.

In one exemplary embodiment of the presently described invention, a unit of personal protective equipment is provided and includes a frame having a front portion, a top, a bottom, a left side wall, a right side wall, a first arm, and a second arm, wherein each of the first and second arms are further comprised of a first end, a second end, an interior surface, and an exterior surface. The first end of each of the first and second arms is connected to the frame along each of side walls and the second end of each of the arms are for provided for supporting the frame. A temperature sensing device is positioned on the interior surface of at least one of the first and second arms, and a human or machine readable display is positioned on an exterior surface, wherein the display is in communication with the temperature sensing device.

In a still further exemplary embodiment of the presently described invention, a system for displaying a personal temperature is provided. The system comprises a unit of personal protective equipment, with the equipment comprising a frame and the frame having first and second supporting arms. A temperature sensor is disposed on one of the first and second supporting arms. The temperature sensor is positioned and intended to collect and monitor temperature data from an individual wearing the unit of personal protective equipment. A display for presenting temperature data collected from the individual in one of a first and second condition is also provided in accordance with the embodiment.

The present invention may display information in a first color such as blue or red when the temperature is below a threshold, and then in a second color when the temperature sensor detects an elevated temperature reading. In addition, the system of the present invention may also have a feature to flash the information so as to help alert individuals nearby. Normal body temperature ranges can be from anywhere from 91.8° to 100.8° F. depending on the gender and age of the individual, and the location where the temperature was taken, e.g. armpit, rectal, ear, oral or surface measurement. A normal temperature is considered to be around 98.6° F., and that is commonly used as an acknowledged threshold.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE INVENTION

Figure 1:
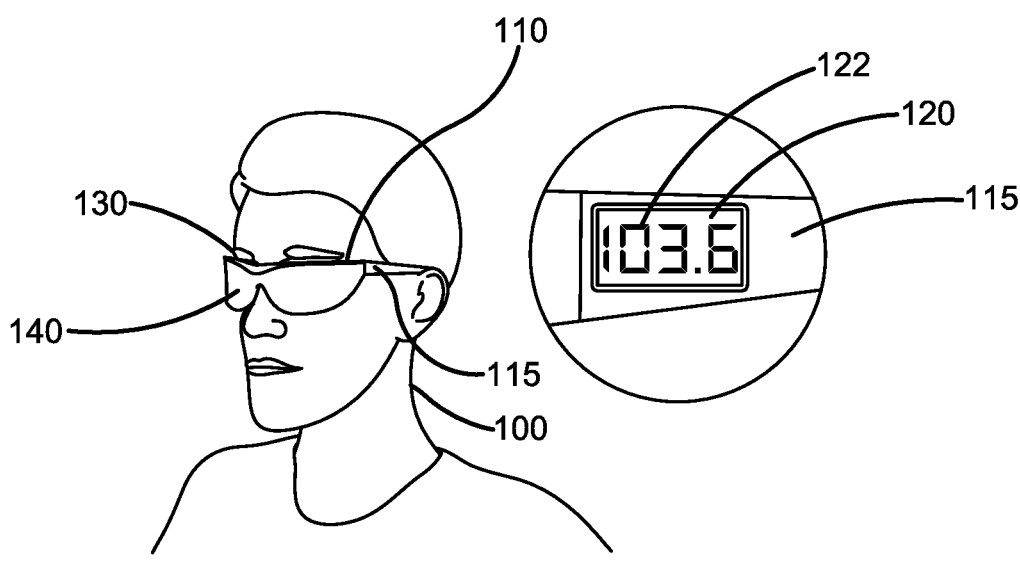
FIG. 1 illustrates a perspective view of an individual wearing one potential embodiment of the personal temperature recording device of the present invention in accordance with the disclosed architecture, as well as a close-up of one potential embodiment of the temperature display.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention or do not limit the scope of the invention. Additionally, an illustrated embodiment need not have all the aspects or advantages shown. Thus, in other embodiments, any of the features described herein from different embodiments may be combined.

The present invention provides for a real time display of a wearer's temperature so that others in the vicinity can be aware if the individual has a fever, and assess the need to maintain appropriate social distancing. In addition, the individual wearing the device can keep track of his or her own temperature if they begin to feel ill or feverish, and can take the next step to obtain medical care and/or self-quarantine if needed. The individual or others nearby can be alerted through one or more of a visual indicator or audible sound issued by the personal protective equipment worn by the individual if a threshold temperature is reached or exceeded.

There are numerous types of temperature sensors including thermocouples, which are voltage devices that indicate temperature measurement with a change in voltage. More specifically, as temperature goes up, the output voltage of the thermocouple rises. Resistive temperature measuring devices also increase in a positive direction, with resistance going up as the temperature rises. Infrared sensors are non-contacting sensors and generally read the heat source. Bimetallic devices take advantage of the expansion of metals when they are heated. In these devices, two metals are bonded together and mechanically linked to a pointer or other device indicating the rise in temperature. When heated, one side of the bimetallic strip will expand more than the other and, when geared properly to an indicator, the temperature measurement is shown.

FIG. 1 illustrates a perspective view of an individual 100 wearing one potential embodiment of the personal temperature recording device 110 of the present invention in accordance with the disclosed architecture, as well as a close-up of one potential embodiment of the temperature display 120. More specifically, the personal protective equipment 110 has a frame portion 130 which supports one or more lenses 140. In traditional eyeglasses, there may be first and second lenses or a single lens extending across both eyes (see e.g., the examples illustrated in FIG. 4). Alternatively, there could be a shield or a screen which is held by the frame 130, such as used to support a face shield (see e.g., the example illustrated in FIG. 5). The frame 130 has first and second arms or supports 115, 116, which will be discussed further below with respect to each of FIGS. 2 and 3.

The frame 130 is further comprised of a display 120, which shows human readable indicia 122 such as it relates to the temperature of the individual wearer 100. Notwithstanding, the indicia is not limited to human readable indicia, and may also comprise machine readable indicia. Further, the display 120 may show the indicia 122 in the color red (or any other user selectable color), meaning that the temperature of the individual has exceeded a certain threshold, say for example 98.6°, or a temperature range. If the temperature of the individual is at or below the selected threshold, a different color may appear in the display 120, such as blue, white or any other suitable color. Alternatively, there may be an intermediate display color, for example, yellow or orange, which would be in the display when the temperature of the individual is in a range of temperatures, for example 91.8° to 100.8° F., that may be acceptable, but not above a particular threshold. The temperature readout may be in Fahrenheit, Celsius or some other human or machine readable metric.

The individuals may also be able to set the threshold depending on their age, gender or other criteria so that the display does not send an alarm when the person is not actually ill. For example, if the set threshold is 98.6°, but the person's normal temperature is 100°, the threshold can be set at that temperature to avoid any unnecessary panic. In this way, the personal protective equipment can be individualized to different wearers. A further discussion of this functionality is provided in conjunction with the discussion regarding FIG. 6.

Figure 2:
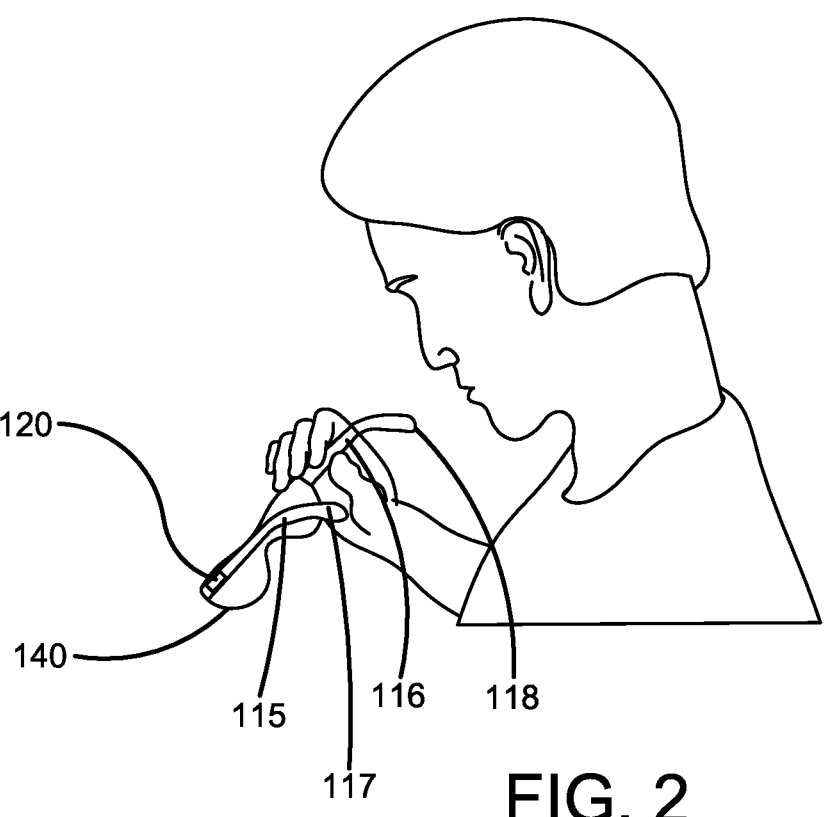
FIG. 2 illustrates a perspective view of an individual activating one potential embodiment of the personal temperature recording device of the present invention in accordance with the disclosed architecture.

FIG. 2 illustrates a perspective view of an individual 100 activating one potential embodiment of the personal temperature recording device 110 of the present invention in accordance with the disclosed architecture, for example, by setting the threshold and data points to fit the individual's particular requirements. More specifically, the personal temperature recording device 110 is comprised of first and second arms 115, 116, which have first and second ends wherein the second ends each comprise an ear support 117, 118, respectively. The ear supports 117, 118 are generally curvilinear in shape, so as to sit on top of and curve around the upper part of the individual's ear, to hold the personal temperature recording device 110 in position on the face of the individual 100.

Figures 3, 4:
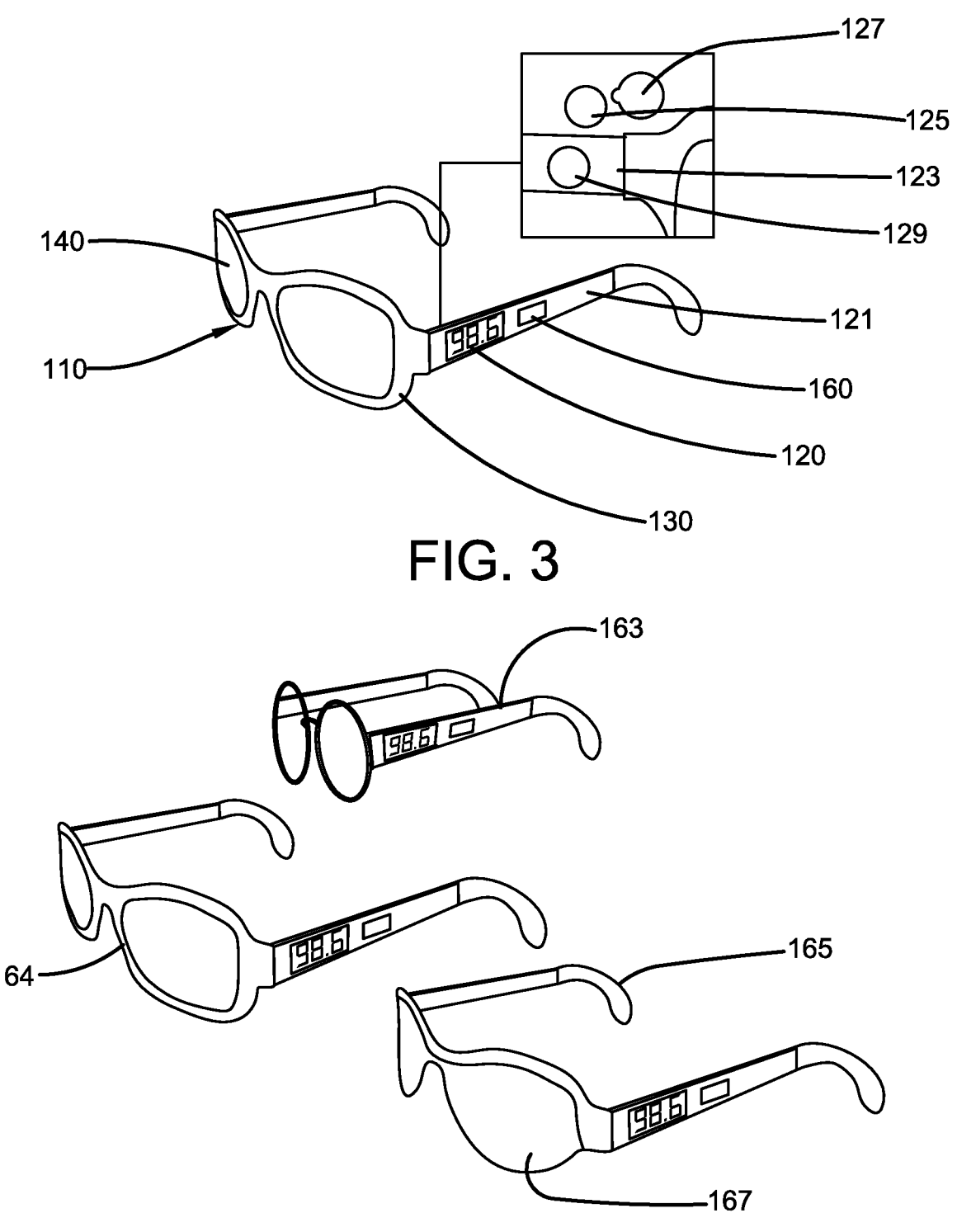
FIG. 3 illustrates a perspective view of one potential embodiment of the personal temperature recording device of the present invention in accordance with the disclosed architecture, as well as a close-up of one potential embodiment of the temperature sensing device positioned on an interior surface of an arm.
FIG. 4 illustrates a perspective view of various potential embodiments of the personal temperature recording device of the present invention in accordance with the disclosed architecture.

FIG. 3 illustrates a perspective view of one potential embodiment of the personal temperature recording device 100 of the present invention in accordance with the disclosed architecture, as well as a close-up of one potential embodiment of the temperature sensing device 125 positioned on an interior surface 123 of an arm 115. More specifically, the personal protective equipment 110 is comprised of a frame 130, lenses 140, first support arm 115 and a second support arm 116. A temperature display 120 is positioned on an exterior surface 121 of the first arm 115, but it should be understood that the temperature display 120 could be provided on either the first arm 115 or the second arm 116 depending on the preferences of the user, or on both arms 115, 116 so that individuals in the vicinity could see the temperature display 120, regardless of what side the observers were on with respect to the wearer 100.

In a further embodiment of the present invention, the interior surface 123 of the first arm 115 (or second arm 116) may comprise a recessed area 129, which will hold the temperature sensor 125 in an appropriate position relative to the head of the individual. The temperature sensor 125 may be further comprised of a cap 127 that is placed over the sensor 125 so that the temperature sensor 125 does not fall out, and is concealed and protected in the body of the first arm 115. The temperature sensor 125 itself may be any type of temperature sensor capable of reading the temperature of the individual 100 from the first arm 115 position including, without limitation, an infrared sensor, bimetallic sensor, resistive sensor, thermocouple and the like. In any event, the temperature sensor 125 is in communication with the temperature display 120 so that the temperature of the individual 100 detected by the temperature sensor 125 is communicated to the temperature display 120 for the benefit of the individual 100 and those in close proximity thereto.

As best shown in FIG. 3, the frame 130 holds or supports one or more lenses 140, depending on the shape, style and/or configuration of the frame 130. Additionally, the personal temperature recording device 100 of the present invention may further comprise a speaker 160 that may be attached to one of both of the first or second arms 115, 116, or any other suitable location along the frame 130. The speaker 160 is in communication with the temperature sensor 125, and may be used to issue an audible sound when, for example, the specified temperature threshold is reached and/or surpassed. In addition, the speaker 160 may be used to alert the individual 100 that the individual needs to replace the temperature sensor 125 or update the same with new software, so that the display can be used to interact with a smartphone or other smart device. This enables the individual to see the temperature display on his or her phone if they are walking, talking or texting while wearing the personal temperature recording device 100, as will be discussed in connection with FIG. 6. Each of the temperature sensor 125, the temperature display 120 and/or the speaker(s) 160 may be powered by a small disposable or rechargeable battery, such as a watch battery. Additionally, the communication accomplished by and between each of temperature sensor 125, the temperature display 120 and/or the speaker(s) 160 may be accomplished through hard wiring (not shown) running along frame 130, or using wireless technology including, without limitation, Bluetooth, RFID, NFC, etc.

FIG. 4 illustrates a perspective view of various potential embodiments of the personal temperature recording device of the present invention in accordance with the disclosed architecture. For example, eyeglasses 163 are comprised of a pair of rounded lenses, two support arms and the personal temperature recording device 110 positioned on a select arm. Similarly, glasses 164 are comprised of a relatively square pair of lenses, two support arms and the personal temperature recording device 110 positioned on a select arm. Finally, eyewear 165 is comprised of a frame having a single lens 167 running across the length of the frame, two support arms and the personal temperature recording device 110 positioned on a select arm.

Figures 5, 6:
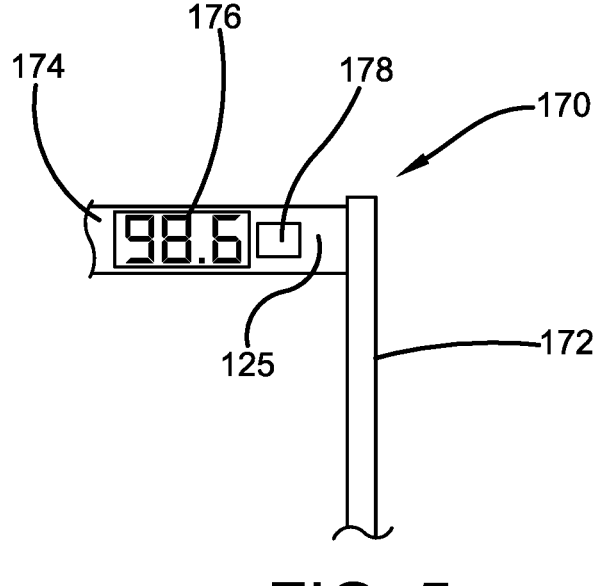
FIG. 5 illustrates a perspective view of a face shield comprising one potential embodiment of the personal temperature recording device of the present invention in accordance with the disclosed architecture.
FIG. 6 illustrates a perspective view of one potential embodiment of the personal temperature recording device of the present invention in accordance with the disclosed architecture, and coupled to a smart device to provide information to the user about the temperature.

FIG. 5 illustrates a perspective view of a face shield 170 comprising one potential embodiment of the personal temperature recording device 110 of the present invention in accordance with the disclosed architecture. More specifically, the face shield 170 is comprised of a screen or shield 172 to protect the wearer's face that is connected to a head band or head support 174. The band or support 174 generally extends circumferentially around the wearer's head, and has a display 176 and a speaker 178 positioned thereon for issuing audible alerts in addition to the visual indicator of the display 176. As previously mentioned, the display 176 and the speaker 178 are in communication with a temperature sensor 125 positioned on an inner surface (i.e., the surface facing the wearer) of the support 174, which is used to monitor the temperature of the wearer.

FIG. 6 illustrates a perspective view of one potential embodiment of the personal temperature recording device 110 of the present invention in accordance with the disclosed architecture, and coupled to a smart device 180 to provide information to the user about the temperature. More specifically, the smart device 180 is preferably in wireless communication with the temperature sensor 125, though the present invention may also include a wired configuration so that the eyewear is tethered to the smart device 180. Further, the smart device 180 may wirelessly connect to a remote server 190, which may have different applications available for downloading, as well as periodic software fixes and updates which the user may subscribe to and receive. By providing an additional connection to the eyewear, a user can monitor his or her condition on their smart device 180, and see any increase in temperature without having to remove the glasses. In addition, the smart device 180 can be connected (wirelessly or hardwired) to other devices so that, for example, medical professionals, loved ones, friends and the like can receive real time temperature information about the wearer and the potential need to take action (e.g., appropriate social distancing) in the event of an elevated temperature reading. By using the smart device 180 and other downloadable applications for the personal protective equipment, the user may then program in to the temperature sensor their particular temperature range according to their age, gender or other conditions, which may lead to a different base temperature than 98.6°.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "eyeglasses," "spectacles," "goggles," "face shields" and the like are interchangeable and refer to improved personal protective gear of the present invention.

Notwithstanding the forgoing, the personal temperature recording device 110 of the present invention and its various components can be of any suitable size and configuration as is known in the art without affecting the overall concept of the invention, provided that they accomplishes the above stated objectives. One of ordinary skill in the art will appreciate that the size, configuration and material of the personal temperature recording device 110 and its various components as shown in the FIGS. are for illustrative purposes only, and that many other sizes of the personal temperature recording device 110 are well within the scope of the present disclosure. Although the dimensions of the personal temperature recording device 110 are important design parameters for user convenience, the personal temperature recording device 110 and its various components may be of any size that ensures optimal performance during use and/or that suits user need and/or preference.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A personal protective equipment comprising:
a frame having a front portion, a top, a bottom, a left sidewall, a right sidewall, a first arm and a second arm, wherein each of the first and second arms are comprised of an interior surface and an exterior surface;
a first end of each of the first and second arms is connected to the frame along each of left and right sidewalls, respectively, and a second end of each of the first and second arms is provided for supporting the frame on a wearer's head;

a temperature sensing device positioned on the interior surface of at least one of the first and second arms;

a temperature display positioned on the exterior surface of at least one of the first and second arms;

wherein the temperature sensing device is a bimetallic temperature sensor;

wherein the temperature display is provided in a human readable format and a machine readable format; and wherein the temperature sensing device is configured to electrically couple to a smart device in a wired configuration; and wherein the first arm further comprises a recess within the interior surface and a cap for covering the recess, and wherein the recess is configured to retain the temperature sensing device and the cap is configured to conceal and encapsulate the temperature sensing device within the first arm; and wherein the personal protective equipment is a face shield;

wherein the temperature sensor is programmable via the smart device to customize a threshold level range comprising multiple temperatures corresponding to a user's normal personal temperature range that has been determined based on at least one biological demographic characteristic of the user that relates to body temperature and the user's normal temperature;

wherein the threshold level range comprises a lower temperature threshold at or below the user's normal personal temperature range and an upper temperature threshold at or above the user's normal personal temperature range;

wherein the temperature display is provided in a colorized readout that corresponds to the user's normal personal temperature range; and wherein the colorized readout is in a first color when a temperature detected by the temperature sensing device exceeds the upper temperature threshold, in a second color when the temperature detected by the temperature sensing device is below the lower temperature threshold, and in a third color when the temperature detected by the temperature sensing device is in the user's normal personal temperature range.

2. The personal protective equipment as recited in claim 1, wherein the temperature sensing device is in wireless communication with the temperature display.

3. The personal protective equipment as recited in claim 1, wherein the first color is red and the second color is blue.

4. The personal protective equipment as recited in claim 1, wherein the frame holds at least one lens for protecting a wearer's eyes.

5. The personal protective equipment as recited in claim 1, wherein the temperature display is disposed on the exterior surface of both of the first and second arms.

6. The personal protective equipment as recited in claim 1, wherein the temperature display is provided with a readout in one of Fahrenheit or Celsius.

7. A pair of eyeglasses comprising:

a frame having a first arm and a second arm each extending outwardly from the frame, wherein the first and second arms are provided for supporting the frame on a face of an individual;

each of the first and second arms having an interior surface and an exterior surface, wherein the interior surface is adjacent to a head of the individual;

a temperature sensor;

a temperature display for displaying a temperature detected by the temperature sensor, wherein the temperature display is positioned on the exterior surface of at least one of the first and second arms, and further wherein the temperature display provides human readable indicia;

a speaker in wireless communication with both the temperature sensor and the temperature display and configured to issue an audible warning when a condition exceeds a threshold; and wherein the temperature sensor is a contact sensor; and wherein the speaker issues an audible warning, wherein the audible warning indicates when to replace the temperature sensor or of a need for a software update; and wherein the first arm further comprises a recess within the interior surface and a cap for covering the recess, and wherein the recess is configured to retain the temperature sensor and the cap is configured to conceal and encapsulate the temperature sensor within the first arm;

wherein the temperature sensor is programmable to customize a threshold level range comprising multiple temperatures corresponding to a user's normal personal temperature range that has been determined based on at least one biological demographic characteristic of the user that relates to body temperature and the user's normal temperature;

wherein the threshold level range comprises a lower temperature threshold at or below the user's normal personal temperature range and an upper temperature threshold at or above the user's normal personal temperature range;

wherein the temperature display is provided in a colorized readout that corresponds to the user's normal personal temperature range; and wherein the colorized readout is in a first color when a temperature detected by the temperature sensing device exceeds the upper temperature threshold, in a second color when the temperature detected by the temperature sensing device is below the lower temperature threshold, and in a third color when the temperature detected by the temperature sensing device is in the user's normal personal temperature range.

8. The pair of eyeglasses as recited in claim 7, wherein the user's normal personal temperature range is from 91.8 degrees F. to 100.8 degrees F.

9. The pair of eyeglasses as recited in claim 7, wherein the frame supports at least one lens for protecting an individual's eyes.

10. A system for detecting and displaying a personal temperature, the system comprising:

a unit of personal protective equipment comprising a frame, a first supporting arm, and a second supporting arm;

a temperature sensor positioned to collect and monitor the personal temperature of an individual wearing the unit of personal protective equipment;

a display for presenting the personal temperature collected from the individual positioned on the exterior surface of at least one of the first and second supporting arms;

wherein the temperature sensor is housed within a recess in an interior surface of the first supporting arm and covered by a cap to completely encapsulate the temperature sensor within the first supporting arm;

wherein the temperature display is provided in a human readable format and a machine readable format; and wherein the system is configured to alert a user when to replace the temperature sensor and of a need for a software update;

wherein the temperature sensor is programmable to customize a threshold level range comprising multiple temperatures corresponding to a user's normal personal temperature range that has been determined based on at least one biological demographic characteristic of the user that relates to body temperature and the user's normal temperature;

wherein the threshold level range comprises a lower temperature threshold at or below the user's normal personal temperature range and an upper temperature threshold at or above the user's normal personal temperature range; and wherein the system is further configured to alert a remote third-party when the upper temperature threshold of the user's normal personal temperature range is exceeded.

11. The system for displaying a personal temperature as recited in claim 10, wherein a first temperature condition of the individual is displayed when the personal temperature is below the lower temperature threshold level and a second temperature condition of the individual is displayed when the personal temperature is above the upper temperature threshold level.

12. The system for displaying a personal temperature as recited in claim 11, wherein the user's normal personal temperature range is a range of 91.8° to 100.8° Fahrenheit or 33.2° to 38.2° Celsius.

13. The system for displaying a personal temperature as recited in claim 11, wherein the first temperature condition is displayed in a first color and the second temperature condition is displayed in a second color distinct from the first color.

\* \* \* \* \*